United States Patent
Nakai et al.

(10) Patent No.: US 6,509,114 B1
(45) Date of Patent: Jan. 21, 2003

(54) CYLINDRICAL LITHIUM-ION BATTERY

(75) Inventors: Kenji Nakai, Uji (JP); Takeshi Nakano, Osato-gun (JP); Kensuke Hironaka, Fukaya (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/525,263

(22) Filed: Mar. 14, 2000

(30) Foreign Application Priority Data

Nov. 17, 1999 (JP) .......................................... 11-326774

(51) Int. Cl.[7] .......................... H01M 4/00; H01M 10/34
(52) U.S. Cl. ............................................. 429/94; 429/57
(58) Field of Search ................................ 429/94, 57, 59

(56) References Cited

U.S. PATENT DOCUMENTS

| | | | | |
|---|---|---|---|---|
| 5,458,993 A | * | 10/1995 | Terao et al. | 429/94 |
| 5,464,705 A | | 11/1995 | Wainwright | |
| 5,534,369 A | * | 7/1996 | Nagaura | 429/161 |
| 5,707,756 A | * | 1/1998 | Inoue et al. | 429/57 |
| 6,040,086 A | * | 3/2000 | Yoshida et al. | 429/211 |
| 6,071,638 A | * | 6/2000 | Fradin | 429/94 |
| 6,132,900 A | * | 10/2000 | Yoshizawa et al. | 429/185 |
| 6,136,464 A | * | 10/2000 | Wakabe et al. | 429/53 |
| 6,228,529 B1 | * | 5/2001 | Kitoh | 429/164 |
| 6,232,014 B1 | * | 5/2001 | Shiota et al. | 429/164 |
| 6,258,485 B1 | * | 7/2001 | Kitoh | 429/231.95 |

FOREIGN PATENT DOCUMENTS

| | | |
|---|---|---|
| EP | 0 726 608 A1 | 8/1996 |
| EP | 0 867 960 A1 | 9/1998 |
| EP | 0 910 129 A1 | 4/1999 |
| JP | 10-321260 | 4/1998 |
| JP | A-11-224693 | 8/1999 |

* cited by examiner

*Primary Examiner*—Tom Dunn
*Assistant Examiner*—Zidia Pittman
(74) *Attorney, Agent, or Firm*—Oliff & Berridge, PLC

(57) ABSTRACT

A cylindrical lithium-ion battery with excellent safety where abnormal heat generation and remarkable deformation of a battery container do not occur even at an abnormal time is provided. When an average diameter of a winding group 6 is A mm, an inner diameter of the battery container 5 is B mm, a longitudinal length of the winding group 6 except for lead pieces extending from the winding group 6 is H mm, and the number of windings where a layer of one unit comprising a negative electrode member/separator/negative electrode member/separator is wound around a shaft core 11 is W, a calculation value K obtained by a formula; $K=(B-A)\times(10000/(W\times H))$ is set to 0.89 or more. When the calculation value K is 0.89 or more, a gap (B−A) between an outer periphery of the winding group 6 and an inner periphery of the battery container 5 that enables the winding group 6 to expand in its diameter direction at an abnormal time is properly secured.

20 Claims, 2 Drawing Sheets

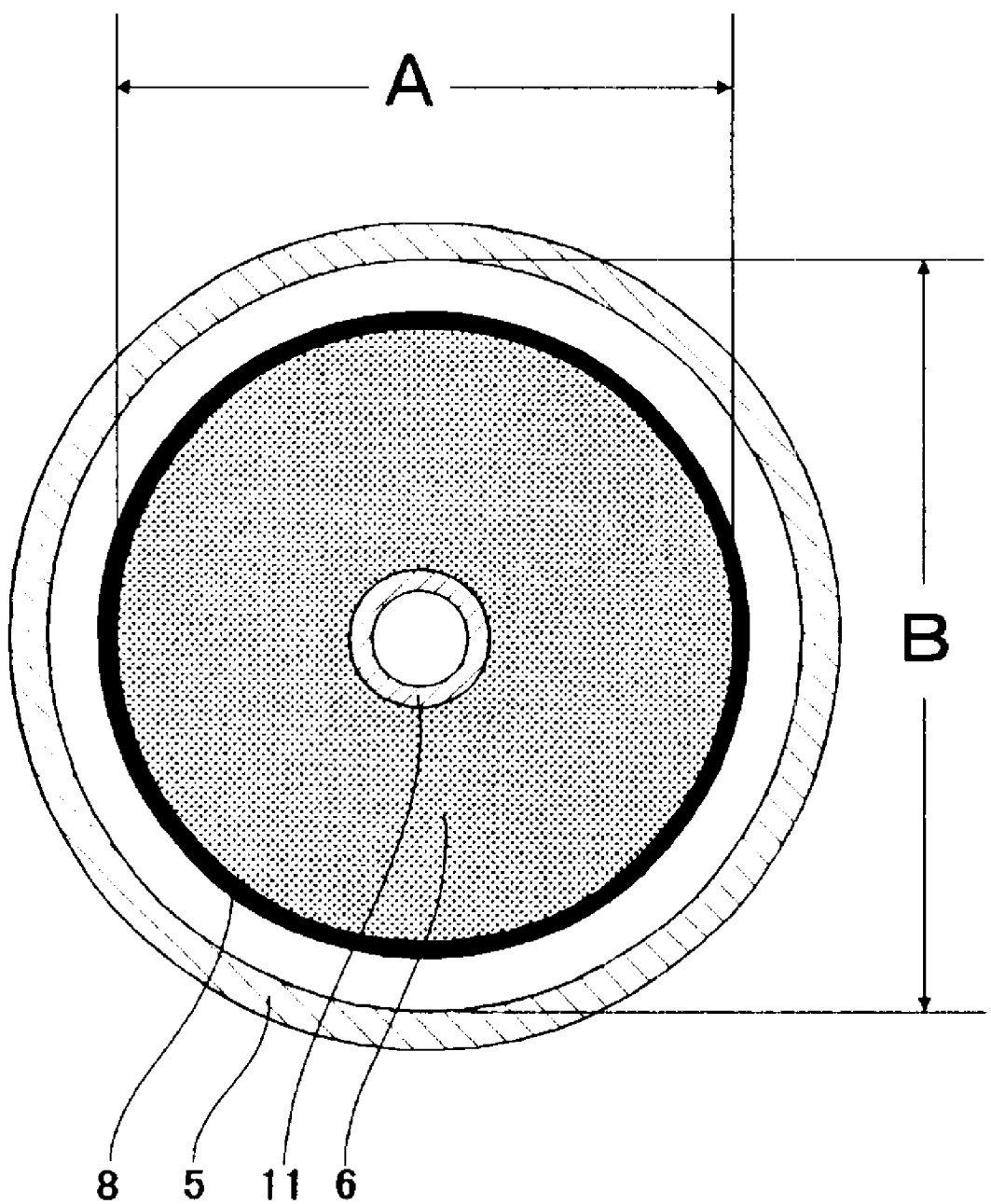

CYLINDRICAL LITHIUM-ION BATTERY

BACKGROUND OF THE INVENTION

1. Field of the Invention

The present invention relates to a cylindrical lithium-ion battery, and in particular relates to a cylindrical lithium-ion battery which is provided with an electrode winding group where a strip-shaped positive electrode having a positive collector applied with positive electrode active-material from/in which lithium ions can be released/occluded through charging/discharging and a strip-shaped negative collector applied with negative electrode active material in/from which lithium ions can be occluded/released through charging/discharging are wound through a strip-shaped separator through which lithium ions can pass, a cylindrical battery container in which the electrode winding group is accommodated, and a lid plate for sealing the battery container having an internal pressure reducing mechanism for discharging gas according to an increase in internal pressure of the battery container.

2. Description of the Related Art

Attention has been paid to a lithium-ion secondary battery as a power supply source for an EV (Electric Vehicle) because of its high power (output) and high energy density. The lithium-ion secondary batteries can be classified into cylindrical shape ones and rectangular shape ones according to their outer shapes. The interior of the cylindrical battery has a winding type structure where each of a positive electrode and a negative electrode comprises a metal foil applied with active material and is formed in a strip shape, and the positive and negative electrodes are wound spirally through a separator(s) so as not to directly come in contact with each other to form an electrode winding group. The electrode winding group is accommodated in a cylindrical can or container which is a battery container, and after the battery container is filled with electrolytic solution, it is sealed and then by initial charge the cylindrical battery is given a function as a battery.

In order to improve energy density, it is preferable to fill up more active material in the battery container, and for this reason, the electrode winding group is inserted into the battery container in a relatively dense manner. However, in a lithium-ion secondary battery where lithium cobaltate and carbon material of graphite system are used as positive active material and negative active material respectively, the active materials of both the positive and negative electrodes cause volume expansion at a time of the initial charge, consequently various drawbacks occur in the electrodes. As a result, the battery causes capacity reduction and life shortening in some cases. For solving the problems, a lithium-ion secondary battery for a civilian use with capacity of about 2 Ah or less, which is nowadays housed in a notebook-type personal computer, a portable telephone or the like, has a structure where a slight space is formed between the electrode winding group and the battery container within the range in which remarkable capacity reduction and energy density lowering can be suppressed. Also, in a case where such a battery is industrially manufactured in a continuous automatic production manner, since inserting easiness of an electrode winding group to a battery container is improved, it is preferable to provide the above space.

Further, in a lithium-ion secondary battery with approximate capacity of 3.0 Ah or more, which is suitable for the EV power supply source, the power becomes necessarily high. Therefore, explosion or firing must completely be prevented from occurring even at an abnormal time when the battery is overcharged, when it is broken or collapsed in a pressurized manner, etc. However, such a lithium-ion secondary battery with high capacity and high power must be increased in length and diameter. If the above strip-shaped electrode comprising the metal foil applied with the active material is made thicker by increasing an application amount of the active material, a layer of the active material peels off or falls off from the foil. As a result, a normal shape of the electrode can not be maintained. For this reason, a diameter of the electrode winding group is made large by making the application thickness of the active material thin and making the strip-shaped electrode long to increase the number of windings.

However, in the electrode winding group where the electrodes are made long and the number of windings is increased, there is a problem that gas generated by decomposition of electrolytic solution or the like at the abnormal time tends to stay inside the electrode winding group and the gas can not be smoothly discharged from an internal pressure reduction mechanism such as a safety valve or the like, thereby causing abnormal heat generation and remarkable deformation of the battery container.

SUMMARY OF THE INVENTION

The present inventors have eagerly studied and researched safety about a cylindrical lithium-ion secondary battery. As a result, it has been found that, for securing safety in the cylindrical lithium-ion battery with high capacity and high power, it is necessary to define a space between an electrode winding group and a battery container. That is, the space must be defined for the purpose of securing safety, which is different from the space defined in the lithium-ion secondary battery for the civilian use with relatively small capacity.

In view of the above circumstances, an object of the present invention is to provide a cylindrical lithium-ion battery where abnormal heat generation and remarkable deformation do not occur even at an abnormal time and which has an excellent safety.

In order to solve the above problems, according to the present invention, there is provided a cylindrical lithium-ion battery, comprising: an electrode winding group where a strip-shaped positive electrode having a positive collector applied with positive electrode active material from/in which lithium ions can be released/occluded through charging/discharging and a strip-shaped negative collector applied with negative electrode active material in/from which lithium ions can be occluded/released through charging/discharging are wound through a strip-shaped separator through which lithium ions can pass; a cylindrical battery container in which the electrode winding group is accommodated; and a lid plate for sealing the battery container having an internal pressure reducing mechanism for discharging gas according to an increase in internal pressure of the battery container, wherein, when an average diameter of the electrode winding group is A mm, an inner diameter of the battery container is B mm, a longitudinal length of the electrode winding group is H mm, and the number of windings of the electrode winding group is W, a calculation value K calculated in accordance with the following Formula (1) is 0.89 or more:

$$K=(B-A)\times 10000/(W\times H) \quad \text{Formula (1)}$$

In the present invention, when the average diameter of the electrode winding group is A mm, the inner diameter of the electrode winding group is B mm, the longitudinal length of the electrode winding group is H mm, and the number of windings of the electrode winding group is W, safety of the cylindrical lithium battery is secured even at the abnormal time or state by setting the calculation value K calculated in accordance with the Formula (1) to 0.89 or more. The Formula (1) means that a gap (space) (B−A) between an outer periphery of the electrode winding group and an inner periphery of the battery container must be defined larger in order to exhaust gas generated inside the electrode winding group by expansion of the electrode winding group and to discharge the gas outside the battery through the internal pressure reducing mechanism smoothly, since the gas generated inside the electrode winding group at the abnormal time tends to stay inside the electrode winding group as the number of windings W is increased and/or the longitudinal length of the electrode winding group H is made longer. According to the present invention, since the gap (B−A) which allows the electrode winding group to expand is defined properly between the outer periphery of the electrode winding group and the inner periphery of the battery container by setting the calculation value k given by the Formula (1) to 0.89 or more, the gas generated inside the electrode winding group at the abnormal time expands the electrode winding group to be exhausted smoothly outside the electrode winding group and further discharged outside the battery through the internal pressure reducing mechanism. Thus, safety of the cylindrical lithium-ion battery can be secured. Here, by transforming the Formula (1) and the gap (B−A) can be obtained in accordance with the following Formula (2):

$$(B-A) \geq 8.9 \times 10^{-5} \times (W \times H) \qquad \text{Formula (2)}$$

In order to discharge the gas generated inside the electrode winding group at the abnormal time outside the battery smoothly, it is preferable to use lithium-manganese complex oxide as the positive active material and amorphous carbon as the negative active material. It is more preferable that the present invention is applied to a battery where the number of windings W of the electrode winding group is 40 or more and discharge capacity of the battery is 3.0 Ah or more. The operations and effects according to the present invention will become more obvious with reference to the preferred embodiments explained below.

BRIEF DESCRIPTION OF THE DRAWINGS

FIG. 2 is a cross-sectional schematic view of the cylindrical lithium-ion battery taken along the line C—C in FIG. 1.

DETAILED DESCRIPTION OF THE PREFERRED EMBODIMENTS

Figure 1:
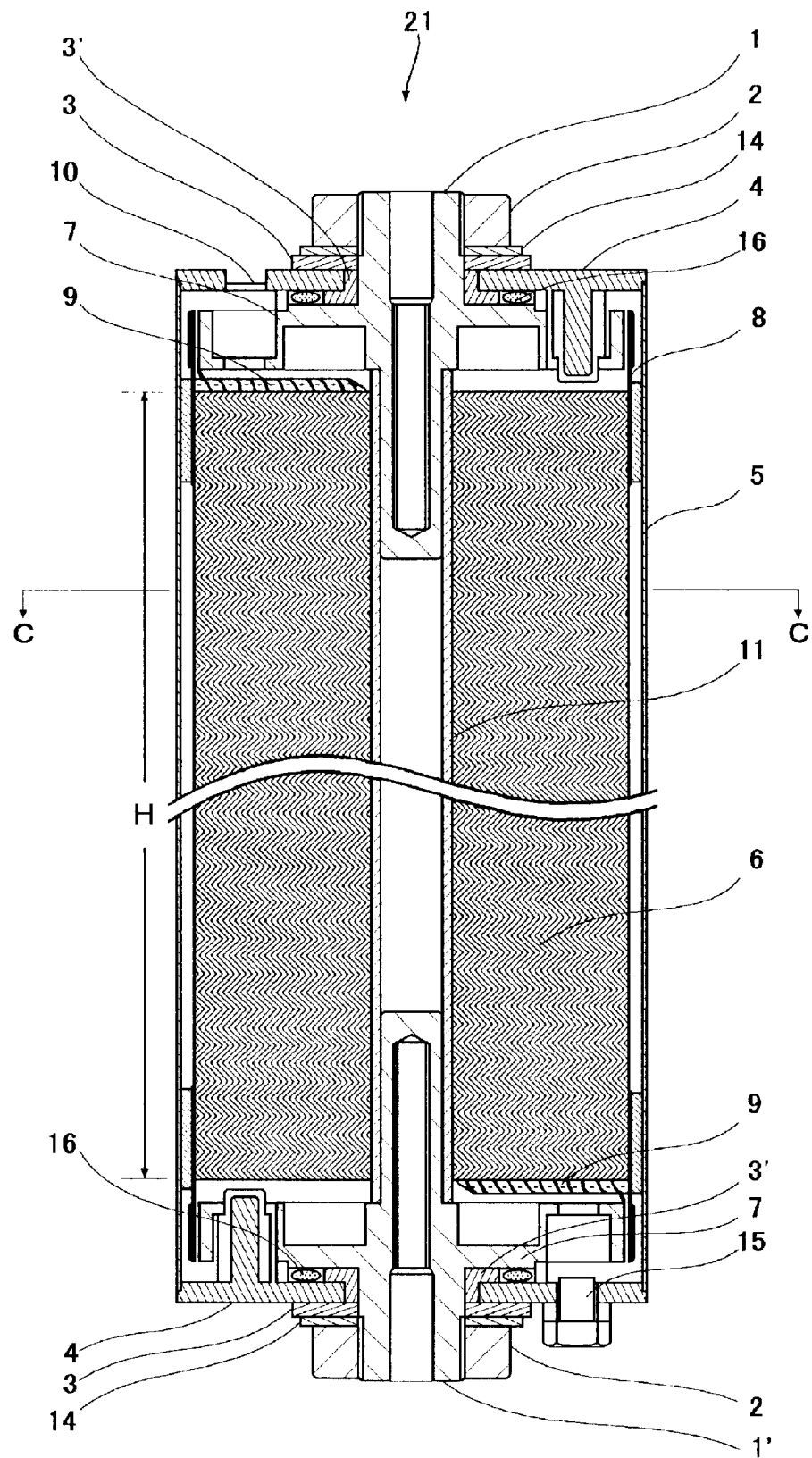
FIG. 1 is a sectional view of a cylindrical lithium-ion battery for an EV use of an embodiment to which the present invention is applicable.

An embodiment where the present invention is applied to a cylindrical lithium-ion battery for an EV use will be explained below with reference to the drawings.

BATTERY MANUFACTURING PROCEDURE
[Manufacture of Positive Electrode Member]

Lithium cobaltate (LiCoO$_2$) powder or lithium manganate (LiMn$_2$O$_4$) powder serving as positive active material from/in which lithium ions can be released/occluded through charging/discharging, scale-shaped graphite (average particle diameter: 20 μm) as electroconductive material, and polyvinylidene fluoride (PVdF) as binder are mixed at a predetermined compounding ratio described later, the resultant mixture is added with N-methyl-2-pyrrolidone (NMP) which is dispersing solvent, and thus added mixture is mixed, thereby producing slurry. The slurry is applied to both surfaces of an aluminum foil (positive collector) having a thickness of 20 μm. At this time, an unapplied portion having a width of 50 mm is left at one side edge along a longitudinal direction of the positive electrode member. Thereafter, the positive electrode member is dried, pressed and then cut, so that a strip-shaped positive electrode member having a width of 300 mm, a predetermined length and a predetermined thickness of the applied portion of the mixture for the positive active material described later. A porosity of the positive active material layer is 35±2%. The above-unapplied portion is notched and a remaining portion thereof forms lead pieces. Also, an interval or space between adjacent lead pieces is set to 20 mm and a width of each of lead pieces is set to 10 mm.

[Manufacture of Negative Electrode Member]

92 weight parts of "MCMB" power which is graphite system carbon powder, manufactured by Osaka Gas Chemicals Co., Ltd. (hereinafter, referred to as Osaka Gas Chemicals) or "Carbotron P" powder which is amorphous (non-crystalline) carbon powder, manufactured by Kureha Chemical Industry Co. Ltd. (hereinafter, referred to as Kureha Chemical), and in/from which lithium ions can be occluded/released through charging/discharging, is added with 8 weight parts of PVdF as binder, is added with NMP which is dispersing solvent, and is mixed to produce slurry. The slurry thus obtained is applied to both surfaces of a rolled copper foil (negative collector) having a thickness of 10 μm. At this time, an unapplied portion having a width of 50 mm is left at one side edge along a longitudinal direction of the positive electrode member. Thereafter, the negative electrode member is dried, pressed and then cut, so that a strip-shaped negative electrode member having a width of 305 mm, a predetermined length and a predetermined thickness of the applied portion of the mixture for the negative active material described later. A porosity of the negative active material layer is 35±2%. The above-unapplied portion is notched in the same manner as the positive electrode member, and a remaining portion thereof forms lead pieces. Also, an interval or space between adjacent lead pieces is set to 20 mm and a width of each of lead pieces is set to 10 mm.

[Assembly of Battery]

The strip-shaped positive and negative electrode members thus manufactured are wound 40 times or more with separators made of polyethylene and each having a thickness of 40 μm and a width of 310 mm interposed therebetween around a shaft core 11. In this embodiment, a superimposed or stacked electrode set comprising the negative electrode/separator/ positive electrode/separator is used as one unit. The shaft core 11 is a hollow tube made of polypropylene and having an outer diameter of 14 mm and an inner diameter of 8 mm which serves as a winding center. At this time, the lead pieces (See reference numeral 9 in FIG. 1) of the positive and negative electrode members are respectively positioned at both end faces opposed to each other with respect to a winding group (electrode winding group). A diameter of the winding group is set to a predetermined average diameter±0.1 mm described later by adjusting the lengths of the positive and negative electrode members and the separators, and the thickness of each of the positive and negative electrode members.

As shown in FIG. 1, the lead pieces 9 extending from the positive electrode member are deformed and all the lead pieces 9 are gathered around a peripheral surface of a flange portion 7 spreading integrally from a periphery of a pole stud (positive electrode external terminal 1) positioned approximately on an extension line of the shaft core 11. After the lead pieces 7 are brought into contact with the flange portion 7, the lead pieces 9 and the peripheral surface of the flange portion 7 are connected and fixed to each other by ultrasonic welding. Also, connecting operation between a flange portion of a negative electrode external terminal 1' and the lead pieces 9 extending from the negative electrode member is carried out in the same manner as the connecting operation between the positive electrode external terminal 1 and the lead pieces 9 extending from the positive electrode member.

Then, insulating covering 8 is applied on to the entire peripheries of the peripheral surfaces of the flange portions 7 of the positive electrode external terminal 1 and the negative electrode external terminal 1'. The insulating covering 8 is also applied on to the entire peripheral surface of the winding group 6. An adhesive tape comprising a base member formed of polyimide and adhesive agent made of hexameta-acrylate and applied to one surface thereof is used as the insulating covering 8. This adhesive tape is wound at least one time from the peripheral surface of the flange portion 7 to the outer peripheral surface of the winding group 6, thereby forming the insulating covering 8. Then, the winding group 6 is inserted into a battery container 5 made of a stainless steel, having an outer diameter of 67 mm and an inner diameter of 66 mm.

Next, as shown in FIG. 1, second ceramic washers 3' are respectively fitted on the pole stud whose distal end constitutes the positive electrode external terminal 1 and the pole stud whose distal end constitutes the negative electrode external terminal 1'. Each second ceramic washer 3' is made of alumina and has a portion abutting on a back face of a disk-shaped battery lid (lid plate) 4, the abutting portion having a thickness of 2 mm, an inner diameter of 16 mm and an outer diameter of 25 mm. Also, alumina-made first planer ceramic washers 3 are respectively placed on the battery lids 4, and the positive electrode external terminal 1 and the negative electrode external terminal 1' are respectively inserted into the first ceramic washers 3. Each first planer ceramic washer 3 has a thickness of 2 mm, an inner diameter of 16 mm and an outer diameter of 28 mm. Then, peripheral faces of the battery lids 4 are fitted to openings of the battery container 5 and the entire contacting portion between the lids 4 and the battery container 5 is laser-welded. At this time, the positive electrode external terminal 1 and the negative electrode external terminal 1' project outside the battery lids 4 through holes formed at centers of the battery lids 4. As shown in FIG. 1, the ceramic washer 3 and a metal washer 14 which is smoother than the bottom face of a metal nut 2 are fitted on each of the positive electrode external terminal 1 and the negative electrode external terminal 1 in this order. Incidentally, a cleavage valve 10 which cleaves according to an increase in battery internal pressure is equipped with one of the battery lids 4. The cleavage valve 10 is set to cleaving pressure of $1.3 \times 10^6$ to $1.8 \times 10^6$ Pa (130 to 180 N/cm$^2$).

Next, the nut 2 is screwed to each of the positive electrode external terminal 1 and the negative electrode external terminal 1' to fasten and fix the battery lid 4 with the flange portion 7 through the second ceramic washer 3', the first ceramic washer 3 and the metal washer 14. At this time, a value of fastening torque was 7 N·m. Incidentally, the metal washer 14 was not rotated until the fastening work was completed. In this state, generating elements accommodated in the battery container 5 are shut off from the atmosphere through compression of each O-ring 16 made of rubber (EPDM) interposed between the back face of the battery lid 4 and the flange portion 7.

Thereafter, a predetermined amount of electrolysis solution is pured into the battery container 5 through liquid-filling opening 15 formed at another of the battery lids 4, and then the liquid-filling opening 15 is sealed so that assembly of a cylindrical lithium-ion battery 21 is completed.

The electrolytic solution is prepared previously in the following manner. Lithium hexafluorophosphate (LiPF$_6$) is dissolved at 1 mole/liter into mixed solution where a volume ratio of ethylene carbonate, dimethyl carbonate and diethyl carbonate is 1:1:1. Incidentally, a current cutting-off mechanism that cuts off electric current in response to an increase in internal pressure inside the battery container 5 is not equipped in the cylindrical lithium-ion battery 21.

As shown in FIGS. 1 and 2, in the cylindrical lithium-ion battery 21, when an average diameter of the winding group 6 is A (hereinafter, referred to as diameter A) (unit:mm), an inner diameter of the battery container 5 is B (hereinafter, referred to as inner diameter B, in this embodiment, 66 mm, as mentioned above) (unit:mm), a longitudinal length of the winding group except for the lead pieces 9 extending from the winding group 6 is H (hereinafter, referred to as length H, in this embodiment, 310 mm which is the same as the width size of the separators, as mentioned above) (unit:mm), and the number of windings where a layer of the superimposed electrode set of one unit comprising the negative electrode member/separator/positive electrode member/separator is wound around the shaft core 11 is W (hereinafter, referred to as winding number W), a calculation value K (hereinafter, referred to as calculation value K) calculated in accordance with the following Formula (1) is set to 0.89 or more. Incidentally, the winding number W is not necessarily an integer value according to the lengths of the positive electrode, the negative electrode and the separators, and the thickness of each of the positive and negative electrodes.

$$K=(B-A)\times 10000/(W\times H) \qquad \text{Formula (1)}$$

EXAMPLE

Next, examples of the cylindrical lithium-ion battery 21 manufactured according to the embodiment will be explained as well as controls (comparative examples) of a cylindrical lithium-ion battery manufactured to confirm effects of the examples. First, a positive electrode member and a negative electrode member were manufactured in the following manner.

Positive Electrode Member

[Positive Electrode Member C-1]

Lithium cobaltate "Cellseed C" manufactured by Nippon Chemical Industry Co., Ltd. (hereinafter, referred to as Nippon Chemical) was used as the positive active material. A compounding ratio of the lithium cobaltate, scale-shaped graphite and PVdF was 60:29:11 by weight percent (WT %). A positive electrode member (hereinafter, referred to as positive electrode member C-1 whose electrode thickness including the positive collector was 248 μm and whose length was 636 cm was manufactured. At this time, apparent density of the layer of the positive active material mixture was 2.1 g/cm$^3$.

[Positive Electrode Member C-2]

Lithium cobaltate "Cellseed C-10" manufactured by Nippon Chemical was used as the positive active material. A compounding ratio of the lithium cobaltate, scale-shaped graphite and PVdF was 65:24:11 by WT %. A positive electrode member (hereinafter, referred to as positive electrode member C-2 whose electrode thickness including the positive collector was 276 μm and whose length was 567 cm was manufactured. At this time, apparent density of the layer of the positive active material mixture was 2.15 g/cm$^3$.

[Positive Electrode Member M-1]

Lithium manganate manufactured by Mitsui Mining and Smelting Co., Ltd. (hereinafter, referred to as Mitsui Mining) was used as the positive active material. A compounding ratio of the lithium manganate, scale-shaped graphite and PVdF was 78:12:10 by WT %. A positive electrode member (hereinafter, referred to as positive electrode member M-1 whose electrode thickness including the positive collector was 258 μm and whose length was 620 cm was manufactured. At this time, apparent density of the layer of the positive active material mixture was 2.35 g/cm$^3$.

[Positive Electrode Member M-2-1]

Lithium manganate manufactured by Mitsui Mining was used as the positive active material. A compounding ratio of the lithium manganate, scale-shaped graphite and PVdF was 85:10:5 by WT %. A positive electrode member (hereinafter, referred to as positive electrode member M-2-1 whose electrode thickness including the positive collector was 247 μm and whose length was 618 cm was manufactured. At this time, apparent density of the layer of the positive active material mixture was 2.55 g/cm$^3$.

[Positive Electrode Member M-2-2]

Lithium manganate manufactured by Mitsui Mining was used as the positive active material. A compounding ratio of the lithium manganate, scale-shaped graphite and PVdF was 85:10:5 by WT %. A positive electrode member (hereinafter, referred to as positive electrode member M-2-2) whose electrode thickness including the positive collector was 247 μm and whose length was 650 cm was manufactured. At this time, apparent density of the layer of the positive active material mixture was 2.55 g/cm$^3$.

[Positive Electrode Member M-2-3]

Lithium manganate manufactured by Mitsui Mining was used as the positive active material. A compounding ratio of the lithium manganate, scale-shaped graphite and PVdF was 85:10:5 by WT %. A positive electrode member (hereinafter, referred to as positive electrode member M-2-2) whose electrode thickness including the positive collector was 247 μm and whose length was 661 cm was manufactured. At this time, apparent density of the layer of the positive active material mixture was 2.55 g/cm$^3$.

[Positive Electrode Member M-3]

Lithium manganate manufactured by Mitsui Mining was used as the positive active material. A compounding ratio of the lithium manganate, scale-shaped graphite and PVdF was 80:12:8 by WT %. A positive electrode member (hereinafter, referred to as positive electrode member M-3) whose electrode thickness including the positive collector was 266 μm and whose length was 640 cm was manufactured. At this time, apparent density of the layer of the positive active material mixture was 2.41 g/cm$^3$.

[Positive Electrode Member M-4]

Lithium manganate manufactured by Mitsui Mining was used as the positive active material. A compounding ratio of the lithium manganate, scale-shaped graphite and PVdF was 80:12:8 by WT %. A positive electrode member (hereinafter, referred to as positive electrode member M-4) whose electrode thickness including the positive collector was 286 μm and whose length was 592 cm was manufactured. At this time, apparent density of the layer of the positive active material mixture was 2.41 g/cm$^3$.

[Positive Electrode Member M-A]

Lithium manganate manufactured by Mitsui Mining was used as the positive active material. A compounding ratio of the lithium manganate, scale-shaped graphite and PVdF was 85:10:5 by WT %. A positive electrode member (hereinafter, referred to as positive electrode member M-A) whose electrode thickness including the positive electrode collector was 111 μm and whose width and length were respectively 82 mm and 374 cm was manufactured. At this time, apparent density of the layer of the positive active material mixture was 2.65 g/cm$^3$.

Negative Electrode Member

[Negative Electrode Member B-1]

Using "MCMB" manufactured by Osaka Gas Chemicals as the graphite system carbon, a negative electrode member (hereinafter, referred to as negative electrode member B-1) whose electrode thickness including the negative collector was 121 μm and whose length was 654 cm was manufactured. At this time, apparent density of the layer of the negative active material mixture was 1.35 g/cm$^3$.

[Negative Electrode Member B-2]

Using "MCMB" manufactured by Osaka Gas Chemicals as the graphite system carbon, a negative electrode member (hereinafter, referred to as negative electrode member B-2) whose electrode thickness including the negative collector was 124 μm and whose length was 638 cm was manufactured. At this time, apparent density of the layer of the negative active material mixture was 1.35 g/cm$^3$.

[Negative Electrode Member P-1]

Using "Carbotron P" manufactured by Kureha Chemical as the amorphous (noncrystalline) carbon, a negative electrode member (hereinafter, referred to as negative electrode member P-1) whose electrode thickness including the negative collector was 147 μm and whose length was 585 cm was manufactured. At this time, apparent density of the layer of the negative active material mixture was 0.98 g/cm$^3$.

[Negative Electrode Member P-1]

Using "Carbotron P" manufactured by Kureha Chemical as the amorphous carbon, a negative electrode member (hereinafter, referred to as negative electrode member P-2-1) whose electrode thickness including the negative collector was 136 μm and whose length was 636 cm was manufactured. At this time, apparent density of the layer of the negative active material mixture was 0.98 g/cm$^3$.

[Negative Electrode Member P-2-2]

Using "Carbotron P" manufactured by Kureha Chemical as the amorphous carbon, a negative electrode member (hereinafter, referred to as negative electrode member P-2-2) whose electrode thickness including the negative collector was 136 μm and whose length was 668 cm was manufactured. At this time, apparent density of the layer of the negative active material mixture was 0.98 g/cm$^3$.

[Negative Electrode Member P-2-3]

Using "Carbotron P" manufactured by Kureha Chemical as the amorphous carbon, a negative electrode member (hereinafter, referred to as negative electrode member P-2-3) whose electrode thickness including the negative collector was 136 μm and whose length was 679 cm was manufactured. At this time, apparent density of the layer of the negative active material mixture was 0.98 g/m$^3$.

[Negative Electrode Member P-3]

Using "Carbotron P" manufactured by Kureha Chemical as the amorphous carbon, a negative electrode member (hereinafter, referred to as negative electrode member P-3) whose electrode thickness including the negative collector was 132 μm and whose length was 658 cm was manufactured. At this time, apparent density of the layer of the negative active material mixture was 0.98 g/cm$^3$.

[Negative Electrode Member P-4]

Using "Carbotron P" manufactured by Kureha Chemical as the amorphous carbon, a negative electrode member (hereinafter, referred to as negative electrode member P-4) whose electrode thickness including the negative collector was 142 μm and whose length was 610 cm was manufactured. At this time, apparent density of the layer of the negative active material mixture was 0.98 g/cm³.

[Negative Electrode Member P-A]

Using "Carbotron P" manufactured by Kureha Chemical as the amorphous carbon, a negative electrode member (hereinafter, referred to as negative electrode member P-A) whose electrode thickness including the negative collector was 79 μm and whose length was 386 cm was manufactured. At this time, apparent density of the layer of the negative active material mixture was 0.98 g/cm³.

Structure

Example 1

As shown in Table 1, a winding group 6 having a diameter A of 63 mm was manufactured by winding a combination of the positive electrode member C-1 and the negative electrode member B-1 via the above-mentioned separators 54.6 times (winding number W=54.6) around the shaft core 11 and a battery 21 was completed. The calculation value K of this battery was 1.77.

TABLE 1

| | Electrode Member | | Dia. | Inner Dia. | Winding | Length | |
|---|---|---|---|---|---|---|---|
| | Positive | Negative | A (mm) | B (mm) | Number W | H (mm) | K |
| Example 1 | C-1 | B-1 | 63 | 66 | 54.6 | 310 | 1.77 |
| Example 2 | C-2 | P-1 | 63 | 66 | 48.7 | 310 | 1.99 |
| Ezample 3 | M-1 | B-2 | 63 | 66 | 53.1 | 310 | 1.82 |
| Example 4-1 | M-2-1 | P-2-1 | 63 | 66 | 52.9 | 310 | 1.83 |
| Example 4-2 | M-2-2 | P-2-2 | 64.5 | 66 | 54.5 | 310 | 0.89 |
| Control 4-3 | M-2-3 | P-2-3 | 65 | 66 | 55.1 | 310 | 0.59 |
| Example 5 | M-4 | P-4 | 64.5 | 66 | 49.7 | 310 | 0.97 |
| Example A-1 | M-A | P-A | 38.2 | 39 | 54.1 | 90 | 1.64 |
| Control Z | M-3 | P-3 | 65 | 66 | 53.3 | 310 | 0.61 |

Example 2

As shown in Table 1, a winding group 6 having the diameter A of 63 mm was manufactured by winding a combination of the positive electrode member C-2 and the negative electrode member P-1 via the above-mentioned separators 48.7 times (winding number W=48.7) around the shaft core 11 and a battery 21 was completed. The calculation value K of this battery was 1.99.

Example 3

As shown in Table 1, a winding group 6 having the diameter A of 63 mm was manufactured by winding a combination of the positive electrode member M-1 and the negative electrode member B-2 via the above-mentioned separators 53.1 times (winding number W=53.1) around the shaft core 11 and a battery 21 was completed. The calculation value K of this battery was 1.82.

Example 4-1

As shown in Table 1, a winding group 6 having the diameter A of 63 mm was manufactured by winding a combination of the positive electrode member M-2-1 and the negative electrode member P-2-1 via the above-mentioned separators 52.9 times (winding number W=52.9) around the shaft core 11 and a battery 21 was completed. The calculation value K of this battery was 1.83.

Example 4-2

As shown in Table 1, a winding group 6 having the diameter A of 64.5 mm was manufactured by winding a combination of the positive electrode member M-2-2 and the negative electrode member P-2-2 via the above-mentioned separators 54.5 times (winding number W=54.5) around the shaft core 11 and a battery 21 was completed. The calculation value K of this battery was 0.89.

Control 4-3

As shown in Table 1, a winding group 6 having the diameter A of 65 mm was manufactured by winding a combination of the positive electrode member M-2-3 and the negative electrode member P-2-3 via the above-mentioned separators 55.1 times (winding number W=55.1) around the shaft core 11 and a battery 21 was completed. The calculation value K of this battery was 0.59.

Example 5

As shown in Table 1, a winding group 6 having the diameter A of 64.5 mm was manufactured by winding a combination of the positive electrode member M-4 and the negative electrode member P-4 via the above-mentioned separators 49.7 times (winding number W=49.7) around the shaft core 11 and a battery 21 was completed. The calculation value K of this battery was 0.97.

Example A-1

As shown in Table 1, a winding group 6 having the diameter A of 38.2 mm was manufactured by winding a combination of the positive electrode member M-A and the negative electrode member P-A via separators having a width of 90 mm instead of the above separators 54.1 times (winding number W=54.1) around the shaft core 11 in accordance with the embodiment stated above and a battery was completed. The inner diameter B of a battery container used for this battery was 39 mm and the calculation value K of this battery was 1.64.

Control Z

As shown in Table 1, a winding group 6 having the diameter A of 65 mm was manufactured by winding a combination of the positive electrode member M-3 and the negative electrode member P-3 via the above-mentioned separators 53.3 times (winding number W=53.3) around the shaft core 11 and a battery 21 was completed. The calculation value K of this battery was 0.61.

Test/Evaluation

[Test]

Next, after each battery of the examples and the controls manufactured in the above manner was charged at a temperature of 25±3° C., it was discharged so that the discharge capacity was measured. The charging conditions were set on constant voltage of 4.2 V, limiting (upper limit) current of 30 A, and a charging time of 4 hours. The discharging conditions were set on constant current of 30 A and final voltage of 2.5 V.

Then, assuming that each battery fell in an abnormal state, a so-called overcharge test where the battery was continuously charged at a constant current of 30 A until any phenomena in its appearance were observed was performed. In an overcharged battery, since internal pressure of the battery is increased with decomposition and gasification of the electrolytic solution due to an abnormal increase in voltage, a phenomenon that the cleavage valve 10 cleaves to jet gas is observed. When the gas jetting is not smoothly carried out, deformation of the battery container 5 occurs and the gas is jetted together with contents in the battery. Accordingly, the weight of the battery becomes light after the phenomena. Therefore, according to the battery appearance and the change in the battery weight (a ratio of the battery weight after the phenomena to the weight before the phenomena (residual rate), a determination can be made on whether behavior of the battery is superior or inferior.

[Test Results]

Measurement results of the discharge capacities and test results of the overcharge tests are shown in the following Table 2.

TABLE 2

| | Discharge Capacity (Ah) | Overcharge Test Results | |
|---|---|---|---|
| | | Deformation | Residual Rate (%) |
| Example 1 | 75 | Non | 63 |
| Example 2 | 75 | Non | 68 |
| Example 3 | 75 | Non | 70 |
| Example 4-1 | 75 | Non | 75 |
| Example 4-2 | 79 | Non | 73 |
| Control 4-3 | 80 | Container Expanded | 50 |
| Example 5 | 75 | Non | 73 |
| Example A-1 | 4 | Non | 75 |
| Control Z | 75 | Container Expanded | 52 |

[Evaluation]

In the batteries of Controls 4-3 and Z, both the calculation values K were below 0.89. Accordingly, gases in the overcharged state were jetted violently together with the contents of the batteries and the battery containers 5 were deformed in an expanding manner as shown in Table 2. The residual rates of the battery weights after the overcharge tests were respectively 50% and 52% which were the smallest values in those of all the tested batteries. These show that large internal pressures were applied to the battery containers 5. On the other hand, in all the batteries of Examples, gases in the overcharged state were discharged gently, the battery containers 5 were not deformed after the overcharge tests, and the residual ratios of the battery weights were relatively high. Accordingly, it should be understood that the batteries of Examples are superior in safety.

In the batteries of Examples 3, 4-1, 4-2, A-1 and 5, since the lithium manganate as the lithium-manganese complex oxide was used for the positive active material, the residual rates of the battery weights after the overcharge phenomena were 70% or more. It should be understood that these batteries are excellent in safety. In the batteries of Example 2, 4-1, 4-2, A-1 and 5, since the amorphous carbon was used for the negative active material, the residual rates of the battery weights after the overcharge phenomena were 68% or more. It should be understood that the batteries are also excellent in safety. Particularly, in the batteries of Examples 4-1, 4-2, A-1 and 5, since the lithium manganate as the lithium-manganese complex oxide was used for the positive active material and the amorphous carbon was used for the negative active material, the residual rates of the battery weights after the overcharge phenomena were 73% or more. Accordingly, it should be understood that the batteries are more excellent in safety.

As mentioned above, in the cylindrical lithium-ion battery 21 of the present embodiment, the space that enables the winding group 6 to expand in its diameter direction is defined between the diameter A of the winding group 6 and the inner diameter B of the battery container 5 (inner diameter B−diameter A) in proportion to an increase in the winding number W and/or the length H in accordance with the above-mentioned formula (1). Accordingly, when the gas is generated inside the winding group 6 at the abnormal time, the winding group 6 is allowed to expand in its diameter direction so that the gas can be smoothly exhausted from both end portions of the winding group 6. Then, when the internal pressure in the battery container 5 reaches the predetermined pressure mentioned above, the cleavage valve 10 cleaves and the gas can be smoothly discharged outside the cylindrical lithium-ion battery 21. Thus, a cylindrical lithium-ion battery with an excellent safety can be realized.

Also, in the cylindrical lithium-ion battery 21 of the present embodiment, the critical value (calculation value K) 0.89 serving as a reference value for safety is given according to the Formula (1). Therefore, downsizing of a cylindrical lithium-ion battery which has been strongly demanded in recent years can be attained while maintaining the safety.

Incidentally, in the present embodiment, the cylindrical lithium-ion batteries with the discharge capacity of 4 Ah or more have been explained. However, it has been confirmed that the present invention is applicable as long as the cylindrical lithium-ion battery has substantial discharge capacity of 3 Ah or more, irrespective of application (intended use) of the battery and/or magnitude of the discharge capacity. Since the present invention is applicable to the battery with high capacity and high power and the behavior of the battery which has been put in the abnormal state is significantly gentle and the battery is excellent in safety, the battery is specifically suitable for the power supply source for the EV.

Also, in this embodiment, the case that the disk-shaped battery lids 4 are laser-welded to the battery container 5 has been explained. However, the present invention is also applicable to a cylindrical lithium-ion battery having a structure where a battery upper lid is caulked to a battery container (can) with a bottom wall so that the container is sealed.

Further, in the above embodiment, the cylindrical lithium-ion battery without the current shut-off mechanism has been explained. However, the present invention can be applied to a battery with the current shut-off mechanism. Thereby, even when the current shut-off mechanism of electric system is not actuated in the abnormal state such as a vehicle collision accident or the like, the internal pressure reduction mechanism such as the cleavage valve 10 or the like of the mechanical system is actuated so that higher safety can be secured in a vehicle mounting battery.

Also, in the embodiment, the adhesive tape comprising the base material of polyimide and the adhesive agent of hexametha-acrylate applied to one side face thereof has been used as the insulating covering 8. This invention is not limited to this adhesive tape. For example, an adhesive tape comprising a base material of polyolefin such as polypropylene, polyethylene or the like and acrylyic system adhesive agent such as hexametha-acrylate, butyl-acrylate or the like applied to one side face or both side faces of the base material, or a tape without applying adhesive agent thereon and comprising polyolefin, polyimide or the like can also be used preferably.

Furthermore, in the lithium-ion battery according to the embodiment, the lithium cobaltate or lithium manganate has been used for the positive electrode, the graphite system carbon or amorphous carbon has been used for the negative electrode, and the solution which has been prepared by dissolving the lithium hexafluorophosphate (LiPF$_6$) at 1 mole/liter into the mixed solution where the volume ratio of ethylene carbonate, dimethyl carbonate and diethyl carbonate is 1:1:1 has been used for the electrolytic solution. However, the procedure for manufacturing a battery according to the present invention is not limited to the above embodiment, and any ordinarily used ones can be used as the binder, the negative active material and the positive active material. In order to secure safety in a battery with high capacity and high power for an EV use, it is preferable to use the lithium manganate as the lithium-manganese oxide for the positive active material instead of lithium-cobalt complex oxide or lithium-nickel complex oxide.

Also, in this embodiment, the PVdF was used as the binder. However, as binders other than the above-mentioned binder, polymers such as Teflon, polyethylene, polystyrene, polybutadiene, isobutylen-isopren rubber, nitrile rubber, styrene-butadiene rubber, polysulfide rubber, cellulose nitrate, cyanoethyl cellulose, various latex, acrylonitrile, vinyl fluoride, vinylidene fluoride, propylene fluoride chloroprene fluoride and the like, and mixture thereof can be used.

Furthermore, as the positive active material for the lithium-ion secondary battery other than the material shown in the above embodiment, lithium-manganese complex oxide into/from which lithium ions can be inserted (occluded) and/or departed (released), and in which lithium ions have been inserted in a sufficient amount in advance is preferable. Lithium manganate having the spinel structure or one/both site(s) of manganese and/or lithium in a crystal thereof is/are replaced or doped with elements other than these elements may be used. Even when active material where an atomic ratio of lithium and manganese has been deviated from the stoichometrical ratio is used, the same effect as the above embodiment can be obtained.

Also, negative active material for the lithium-ion battery other than ones shown in the above embodiment can be used, which does not limit the present invention. For example, natural graphite, various artificial graphite materials and cokes may be used. The particle shapes of these materials may include scale shape, sphere shape, fiber shape, massive shape and the like, but the negative active material is not limited to particular shapes.

Also, as the electrolytic solution, electrolytic solution where an ordinary lithium salt is dissolved as electrolyte into organic solvent, and the lithium salt and the organic solvent are not limited to these particular ones. For example, as the electrolyte, LiClO$_4$, LiAsF$_6$, LiPF$_6$, LiBF$_4$, LiB (C$_6$H$_5$)$_4$, CH$_3$SO$_3$Li, CF$_3$SO$_3$Li and the like, and mixture thereof may be used.

Further, the organic solvent of the non-aqueous electrolytic solution other than ones shown in the above embodiment, polypropylene carbonate, ethylene carbonate, ethylmethyl carbonate, vinylene carbonate, 1, 2-dimethxy ethane, γ-butyrolactone, tetrahydrofuran, 1, 3-dioxolane, 4-methyl-1, 3-dioxolane, diethyl ether, sulfolane, methyl sulfolane, acetonitrile, propionitrile or the like, mixture of two kinds or more thereof can be used. Furthermore, a mixture-compounding ratio thereof is not limited to particular ratios.

What is claimed is:

1. A cylindrical lithium-ion battery, comprising:
   an electrode winding group where a strip-shaped positive electrode having a positive collector applied with positive electrode active material from/in which lithium ions can be released/occluded through charging/discharging and a strip-shaped negative collector applied with negative electrode active material in/from which lithium ions can be occluded/released through charging/discharging are wound through a strip-shaped separator through which lithium ions can pass;
   a cylindrical battery container in which the electrode winding group is accommodated; and
   a lid plate for sealing the battery container having an internal pressure reducing mechanism for discharging gas according to an increase in internal pressure of the battery container,
   wherein, when an average diameter of the electrode winding group is A mm, an inner diameter of the cylindrical battery container is B mm, a longitudinal length of the electrode winding group is H mm, and the number of windings of the electrode winding group is W, a calculation value K calculated in accordance with the following Formula (1) is 0.89 or more:

$$K=(B-A)\times 10000/(W\times H) \qquad \text{Formula (1)}.$$

2. A cylindrical lithium-ion battery according to claim 1, wherein the positive electrode active material is lithium-manganese complex oxide.

3. A cylindrical lithium-ion battery according to claim 1, wherein the positive electrode active material is lithium manganate.

4. A cylindrical lithium-ion battery according to claim 1, wherein the negative electrode active material is amorphous carbon.

5. A cylindrical lithium-ion battery according to claim 1, wherein the number of windings W is 40 or more.

6. A cylindrical lithium-ion battery according to claim 1, wherein discharge capacity of the battery is 3.0 Ah or more.

7. A cylindrical lithium-ion battery according to claim 2, wherein the negative electrode active material is amorphous carbon.

8. A cylindrical lithium-ion battery according to claim 2, wherein the number of windings W is 40 or more.

9. A cylindrical lithium-ion battery according to claim 2, wherein discharge capacity of the battery is 3.0 Ah or more.

10. A cylindrical lithium-ion battery according to claim 3, wherein the negative electrode active material is amorphous carbon.

11. A cylindrical lithium-ion battery according to claim 3, wherein the number of windings W is 40 or more.

12. A cylindrical lithium-ion battery according to claim 3, wherein discharge capacity of the battery is 3.0 Ah or more.

13. A cylindrical lithium-ion battery, comprising:
   an electrode winding group where a strip-shaped positive electrode having a positive collector applied with positive electrode active material from/in which lithium ions can be released/occluded through charging/discharging and a strip-shaped negative collector applied with negative electrode active material in/from which lithium ions can be occluded/released through charging/discharging are wound through a strip-shaped separator through which lithium ions can pass;
   a cylindrical battery container in which the electrode winding group is accommodated; and
   a lid plate for sealing the battery container having an internal pressure reducing mechanism for discharging gas according to an increase in internal pressure of the battery container,
   wherein, when an average diameter of the electrode winding group is A mm, an inner diameter of the cylindrical battery container is B mm, a longitudinal length of the electrode winding group is H mm, and the number of windings of the electrode winding group is W, a gap (B−A) defined between the inner diameter B and the average diameter A satisfies the following Formula (2):

$$(B-A) \geq 8.9 \times 10^{-5} \times (W \times H) \qquad \text{Formula (2)}.$$

14. A cylindrical lithium-ion battery according to claim 13, wherein the positive electrode active material is lithium-manganese complex oxide.

15. A cylindrical lithium-ion battery according to claim 13, wherein the positive electrode active material is lithium manganate.

16. A cylindrical lithium-ion battery according to claim 13, wherein the negative electrode active material is amorphous carbon.

17. A cylindrical lithium-ion battery according to claim 13, wherein the number of windings W is 40 or more.

18. A cylindrical lithium-ion battery according to claim 13, wherein discharge capacity of the battery is 3.0 Ah or more.

19. A cylindrical lithium-ion battery according to claim 15, wherein the negative electrode active material is amorphous carbon.

20. A cylindrical lithium-ion battery according to claim 19, wherein the number of windings W is 40 or more and discharge capacity of the battery is 3.0 Ah or more.

* * * * *